United States Patent [19]

Stackman et al.

[11] 4,208,502
[45] Jun. 17, 1980

[54] CURABLE RESIN COMPOSITIONS

[75] Inventors: Robert W. Stackman, Morristown; Anthony B. Conciatori, Chatham, both of N.J.

[73] Assignee: Celanese Corporation, New York, N.Y.

[21] Appl. No.: 489,628

[22] Filed: Jul. 18, 1974

[51] Int. Cl.$^2$ ............................................ C08F 222/10
[52] U.S. Cl. ............................. 526/292; 204/159.16; 204/159.22; 526/293; 526/294; 526/295; 560/83; 560/90
[58] Field of Search ............... 260/DIG. 24, 75 UA, 260/75 H, 78.4 E, 78.5 B, 475 N; 526/292, 293, 294, 295; 560/83, 90

[56] References Cited

U.S. PATENT DOCUMENTS

| | | |
|---|---|---|
| 2,680,105 | 6/1954 | Baker .............................. 260/75 H X |
| 3,221,043 | 11/1965 | Fekete et al. ..................... 260/475 N |
| 3,455,801 | 7/1969 | D'Alelio ......................... 260/75 H X |
| 3,455,802 | 7/1969 | D'Alelio ......................... 260/75 H X |
| 3,527,737 | 9/1970 | Masuhara et al. ............... 260/78.5 B |
| 3,657,384 | 4/1972 | Yoshida et al. ............. 260/78.5 B X |
| 3,776,980 | 12/1973 | Scardiglia et al. ............ 260/75 H X |

FOREIGN PATENT DOCUMENTS 595758  12/1947  United Kingdom .

OTHER PUBLICATIONS

Roberts et al., *Basic Principles of Organic Chemistry*, W. A. Benjamin, Inc., New York, N.Y. (1964), p. 560.

*Primary Examiner*—Walter C. Danison
*Attorney, Agent, or Firm*—Kenneth A. Genoni

[57] ABSTRACT

Curable compositions are provided by the interaction of bis(2-hydroxyethyl) tetrachloroterephthalate with acrylic acid derivatives to form flame retardant unsaturated esters of tetrachloroterephthalic acid.

2 Claims, No Drawings

CURABLE RESIN COMPOSITIONS

BACKGROUND OF THE INVENTION

The present invention has developed from the investigation of new polymeric compositions from tetrachloroterephthalic acid which is now a readily available commercial product. It was deemed desirable to endeavor to introduce the flame retardant properties of tetrachloroterephthalic acid into polymerizable compositions which could then be cured to high molecular weight, three-dimensional resinous structures that are substantially infusible and insoluble.

It is thus an object of the present invention to provide novel curable compositions based on tetrachloroterephthalic acid. It is another object of this invention to provide hydroxyethyl esters of tetrachloroterephthalic acid. It is another object of this invention to provide polymerizable unsaturated esters of tetrachloroterephthalic acid. It is still another object of this invention to provide methods for curing unsaturated esters of tetrachloroterephthalic acid. It is a further object of this invention to provide flame retardant thermoset resins useful as coatings, films and molded articles.

Other objects and advantages of the present invention will become apparent from the following description and examples.

DESCRIPTION OF THE INVENTION

The present invention in one of its embodiments is a process for producing novel curable compositions based on bis(2-hydroxyethyl)tetrachloroterephthalate. The process involves mixing together under reactive conditions bis(2-hydroxyethyl)tetrachloroterephthalate and an olefinically unsaturated compound of the formula:

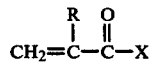

wherein R is a radical selected from hydrogen and alkyl groups containing between 1 and about 4 carbon atoms; and X is a radical selected from hydroxyl, halogeno, and alkoxyl groups containing between 1 and about 4 carbon atoms.

The bis(2-hydroxyethyl)tetrachloroterephthlate reactant can be produced in one method by the condensation of two molecules of ethylene glycol with a molecule of tetrachloroterephthaloyl chloride. Bis(2-hydroxyethyl)tetrachloroterephthalate can also be synthesized in a manner analogous to the widely used methods practiced for the producing of bis(2-hydroxyethyl)terephthalate. The methods require modification to compensate for the lower chemical reactivity of tetrachloroterephthalic acid as compared with terephthalic acid. In these methods, the dicarboxylic acid is suspended in an inert liquid medium and then reacted with an alkylene oxide in the presence of a catalyst. For example, see U.S. Pat. No. 3,037,049, May 29, 1962 to Alexander A. Vaitekunas which discloses the use of such liquid reaction mediums as aromatic hydrocarbons, ketones and dioxane and which also discloses the use of tertiary amine catalysts. Also such patents as Belgian Pat. No. 666,527, Belgian Pat. No. 660,257, British Pat. No. 999,242, British Pat. No. 1,029,669, German Pat. No. 1,157,623, French Pat. Nos. 1,415,134; 1,430,842 and 1,408,874 and Netherlands Pat. Nos. 6,413,334; 6,506,220 and 6,508,415 disclose esterification processes wherein various reaction media such as hydrocarbons, halohydrocarbons, water, alcohols, nitriles and dimethylformamide-water are disclosed and wherein such catalysts as phosphines, arsines, quaternary ammonium compounds, stibines, amino acids, alkali sulfites, alkali chlorides and alkali nitrates are used as catalysts. More recent advances in methods for producing bis(2-hydroxyl)terephthalate are described in U.S. Pat. Nos. 3,584,031; 3,644,484 and 3,597,471.

The condensation reaction of bis(2-hydroxyethyl)tetrachloroterephthalate with an olefinically unsaturated compound, such as acrylic acid or acryloyl chloride, is accomplished by conventional esterification procedures. In the case of acrylic acid esterification, an acid catalyst such as p-toluenesulfonic acid can be employed. If the esterification involves acryloyl chloride, then it is convenient to include in the esterification mixture an acid acceptor such as pyridine. Approximately 2 to 2.5 moles of acrylic acid derivative is reacted per mole of bis(2-hydroxyethyl)tetrachloroterephthalate.

The condensation reaction between bis(2-hydroxyethyl)tetrachloroterephthalate and acrylic acid derivative is conducted at a temperature between about 25° C. and 250° C. For most reactions a temperature between about 100° C. and 200° C. is advantageous. Inert diluents or solvents are employed as desired or necessary to enable proper handling and insure proper mixing of the reactants. Recommended inert reaction media are tetrahydrofuran, dioxane, alkyl-substituted dioxolanes such as 2-propyldioxolane, the dialkyl ethers of alkylene glycols, benzene, toluene and xylene.

The reaction between bis(2-hydroxyethyl) tetrachloroterephthalate and acrylic acid derivative is conveniently conducted at atmospheric pressure, although pressures both above and below atmospheric can be employed. It is desirable to exclude air during the reaction by providing an inert atmosphere such as nitrogen to cover the reaction mixture to prevent or inhibit any degradation of the product or deactivation of any catalyst that is present. It is also advantageous to include a polymerization inhibitor in the reaction medium, e.g., hydroquinone, and to shield the reaction system from excessive light to prevent polymerization of the olefinically unsaturated components of the reaction mixture. The inhibitor comprises from about 0.1 percent to about 5 percent by weight of the reactants.

Superior results are obtained when the acrylic acid derivative is added dropwise to a mixture of the other components under reactive conditions. This technique suppresses the formation of polymeric by-product.

The curable acrylate esters of tetrachloroterephthalate so produced by the above-described process can be homopolymerized in the presence of free-radical catalysts or by irradiation, or may be copolymerized with other polymerizable olefinically unsaturated monomers and polymers.

The free-radical catalyst is employed in an amount between about 0.01 and 10 percent based on the total weight of the polymerizable mixture. Suitable catalysts include benzoyl peroxide, isopropyl percarbonate, t-butyl hydroperoxide, di-t-butyl peroxide, t-butyl perbenzoate, azobisisobutyronitrile, cumene hydroperoxide, or others equally well known in the art.

When copolymers are to be produced, any monomer or monomers can be employed as long as they are copolymerizable and compatible with the present invention acrylate esters of tetrachloroterephthalate. Illustrative of comonomers are the vinyl cyclic compounds (including monovinyl aromatic hydrocarbons), e.g., styrene, o-, m-, and p-chlorostyrenes, -bromostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc.; vinyl pyridine, divinyl benzene, trivinyl benzene, allyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated amides such as acrylamide, and N-substituted acrylamides, e.g., N-methylol acrylamide, N-methyl acrylamide, N-phenyl acrylamide, and the like.

Examples of a preferred class of comonomers are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide. Also preferred are comonomers such as acrylonitrile and substituted acrylonitrile.

The monomers and catalysts may be heated to promote curing. Although curing temperatures will vary from monomer to monomer, generally temperatures from about 60° C. to about 200° C. are used to bring about the free-radical cure of the monomers.

In many instances, it may be desirable to polymerize without the addition of external heat in which cases it is customary to add an accelerator to the system. Suitable accelerators include cobalt salts, such as cobalt octoate or cobalt naphthenate, and amine accelerators such as N'N-dimethylaniline, N-ethyl-N-hydroxyethyl-m-ethylaniline and N-propyl-N-hydroxyethyl-m-methylaniline.

The polymerizable reaction system can be cured by actinic light and by ionizing irradiation. The term "irradiation" means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results.

Various types of high power electron linear accelerators are commercially available, for example, the ARCO type traveling wave accelerator, model Mark I, operating at 3 to 10 million electron volts, such as supplied by High Voltage Engineering Corporation, Burlington, Mass.; or other types of accelerators as described in U.S. Pat. No. 2,763,609 and in British Patent No. 762,953 are satisfactory for the practice of this invention.

The polymers or interpolymers formed by the polymerization of the new compounds of this invention and the interpolymerization of mixtures of said compounds have utility as coatings for all types of substrates. They may be used as protective coatings for wood to form panels for walls, as coatings on plastics to form floor tiles, as coatings on metals such as aluminum and steel panels and as coatings for other substrates. The coatings have the advantage of scratch-resistance, mar-resistance, water-resistance and chemical-resistance, and the cured coatings have a high degree of crosslinking.

Incorporation of antimony oxide into the crosslinked resins increases the nonflammability. The quantity of antimony oxide incorporated can vary over a wide range, e.g., as high as about 40% by weight. A useful ratio of halogen to antimony is about 3 to 1. This ratio corresponds to a bis(2-hydroxyethyl)tetrachloroterephthalate diacrylate ester to antimony oxide weight ratio of 4 to 1.

The resinous compositions of the present inventions are suitable for special electrical applications such as wire cord covering, and use in capacitors, transformers and other electrical specialties requiring nonflammable film structures.

This invention provides a valuable class of resinous composition having a high degree of resistance to chemicals and solvents and improved water absorption properties, which exhibit improved thermal properties, are prepared from commercially available materials, are relatively inexpensive, have a relatively high order of nonflammability, which in many cases are nonburning and which can be molded alone or with reinforcing materials to give hard, durable plastics.

The curable compositions of the present invention can be formulated for injection molding applications to provide shaped plastic articles characterized by nonflammability and chemical resistance.

The following examples are further illustrative of the present invention. The reactants and other specific ingredients are presented as being typical, and various modifications can be devised in view of the foregoing disclosures within the scope of the invention.

EXAMPLE 1

Preparation of Bis(2-hydroxyethyl)Tetrachloroterephthalate

A one-liter Parr pressure reactor is charged with 60.8 grams of tetrachloroterephthalic acid (0.2 M), 500 ml. of xylene, 0.3 gram of tetramethylammonium chloride, and 25 grams of ethylene oxide (0.55 M).

The pressure reactor is sealed and heated to 160° C. with agitation, and the reaction temperature is maintained for about five hours. After cooling, the reaction mixture is removed from the reactor, and mixed with activated carbon. The reaction mixture is heated briefly, and then filtered to remove the solids.

The xylene filtrate solution is distilled to dryness, and the product yield is about 62.5 grams (79%) of bis(2-hydroxyethyl)tetrachloroterephthalate.

EXAMPLE 2

Preparation of Bis(2-hydroxyethyl)Tetrachloroterephthalate

A mixture of 34 grams of tetrachloroterephthaloyl chloride in 85 ml. of tetrahydrofuran and 100 ml. of dioxane are charged to a 500 ml. flask. About 75 grams of ethylene glycol is added dropwise to the solution. This is followed by dropwise addition of 20 grams of pyridine over a period of one hour. The reaction mixture is stirred for 24 hours, and then the volume concentrated by distillation up to a temperature of about 120° C.

The solid residue is dissolved in ether-benzene solvent mixture. The solution is washed with dilute sulfuric acid, and water, and then dried over magnesium sulfate. After filtration, the solution is distilled in vacuo and the solid product is recovered and recrystallized from benzene.

EXAMPLE 3

Preparation of Diacrylate Ester of Bis(2-hydroxyethyl)Tetrachloroterephthalate A reaction is charged with 800 grams of bis(2-hydroxyethyl)tetrachloroterephthalate, 100 ml. of cyclohexane, 130 grams of acrylic acid, 6 ml. of sulfuric acid and 10 grams of hydroquinone.

The mixture is heated to reflux at 100° C., and 400 grams of acrylic acid are added dropwise over a period of 30 minutes. The reaction is continued for an additional 5 hours during which time 250 ml. of cyclohexane are added, and water is distilled off. The reaction solution is washed with water, dried, and then concentrated by distillation. The residue is slurried with acetone and the product is recovered by filtration.

In the same manner, employing methacrylic acid as a reactant, the dimethacrylate ester of bis(2-hydroxyethyl)tetrachloroterephthalate is prepared.

EXAMPLE 4

Preparation of A Cured Coating Composition

A steel plate is covered with a composition comprising 100 parts of diacrylate ester of bis(2-hydroxyethyl)-tetrachloroterephthalate and 1 part of cumene hydroperoxide. The composition is heated in a nitrogen atmosphere at 100° C. for one hour. The resulting cured product is a hard, mar-resistant film.

EXAMPLE 5

Preparation of a Cured Coating By Irradiation

An aluminum plate is coated with a benzene solution of dimethyacrylate ester of bis(2-hydroxyethyl)tetrachloroterephthalate.

The coating is subjected to electric beam impingement at an accelerating potential of 400 kilovolts and a tube current of 16 milliamps. The cured film is extremely hard and mar-resistant.

EXAMPLE 6

Preparation of a Thermoset Composition

A concentrated solution of dimethacrylate ester of bis(2-hydroxyethyl)tetrachloroterephthalate in styrene is prepared. One part by weight of benzoyl peroxide, based on the total weight of solution, is added. The solution is introduced into a mold, and heated at 50° C. for several hours. The resulting molded product is a hard, smooth, clear resin composition.

A blend comprising bis(2-hydroxyethyl)tetrachloroterephthalate, diallyl phthalate and a catalytic quantity of cobalt naphthenate is prepared which is suitable for injection molding. The resulting product is a clear, hard thermoset body.

The cured resins so produced are flame retardant as compared to analogous composition not containing a high weight percentage of halogen substituents.

What is claimed is:

1. A curable polyester characterized by the formula:

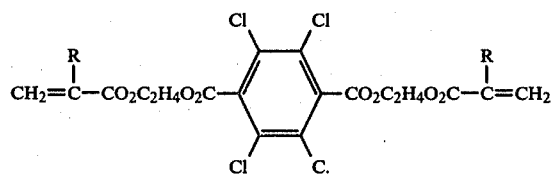

wherein R is a radical selected from hydrogen and methyl groups.

2. A flame retardant polyester comprising the composition of claim 1 as a cured resin.

* * * * *